Figure 1:
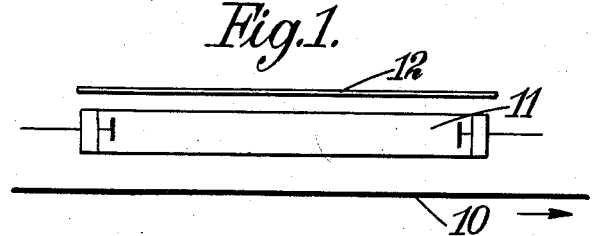

July 29, 1958  W. BERRY ET AL  2,845,541
POLYETHYLENE FILMS
Filed Nov. 29, 1954

INVENTORS
William Berry
Richard A. Rose
Charles R. Bruce
By Watson, Cole, Grindle & Watson
ATTORNEYS United States Patent Office 2,845,541
Patented July 29, 1958

2,845,541

POLYETHYLENE FILMS

William Berry, Durleigh, Bridgwater, Somerset, and Richard Arthur Rose and Charles Richard Bruce, Bridgwater, Somerset, England, assignors to British Cellophane Limited, Bridgwater, England, a British company Application November 29, 1954, Serial No. 471,842

4 Claims. (Cl. 250—52)

This invention is for improvements in or relating to polyethylene films.

Solid polyethylene films and methods of their manufacture are well known. However, solid polyethylene films, as normally made, display rather poor receptivity for printing inks of the known types.

A process for the manufacture of improved polyethylene films, which process comprises subjecting one or both surfaces of a pre-formed polyethylene film to superficial chlorination, has already been described in British patent specification No. 581,717. The superficially chlorinated polyethylene films are stated to be readily dyed and printed by known methods. However, although the process described represents a considerable advance, we have found that there is still room for improvements.

We have now found that improvements in the properties of polyethylene films, including improvements in the receptivity for printing inks, can be secured by subjecting the film to irradiation with ultra-violet light.

The present invention comprises a method of preparing the surface of a film of solid polyethylene plastic for printing, which method comprises subjecting the surface of the film which is to be printed to irradiation with ultra-violet light emitted from an artificial source, said irradiation being of an intensity of at least 0.5 microwatt per square centimeter and for a period such that the total irradiation is at least 180 microwatt-seconds per square centimeter, and sufficient to improve the bonding properties of the film to the extent that printing ink is readily accepted by the surface of the solid film which has been irradiated.

The invention includes a method of printing on film of solid polyethylene plastic, having an average molecular weight ranging from 12,000 to 24,000 and a thickness between 0.001 inch and 0.020 inch, which method comprises subjecting at least that surface of the film which is to be printed to irradiation with ultra-violet light emitted from an artificial source and heaving a wave-length in the range comprised between 3200 A. and 1800 A., said irradiation being of an intensity of at least 0.5 microwatt per square centimeter and for a period such that the total irradiation is at least 180 microwatt-seconds per square centimeter, and then, when the film is in the cool condition, printing on the surface of the solid film which has been irradiated.

The following test (the "adhesive tape test") has been used to determine the ready acceptance of the printing ink by the surface of the pre-formed solid film.

The pre-formed film of solid polyethylene plastic is printed, in the machine to be employed in the contemplated large scale printing operations, with the particular printing ink to be employed, so as to leave on the surface of the film a printed layer of approximately 0.0001", and normally not exceeding 0.0002", in thickness, and the applied printing ink is allowed to dry under conditions similar to those in the contemplated large-scale printing operations. A length of the dried printed film is laid on a flat sheet of glass, and a strip of cellulose adhesive tape (of the kind hereinafter described), ½" in width, is applied to the printed surface of the film with its adhesive surface in contact with the printed surface of the film, and is pressed into contact by rolling thereover a brass roller, 1" in diameter and ¾" in width, weighted to 600 grams. The tape is then stripped by a steady pull, by hand, at the rate of 2½" per second. If the print, applied to the film, is substantially unaffected by the application and subsequent stripping of the cellulose adhesive tape, the printing ink is characterised as showing "ready acceptance" by that surface of the pre-formed solid film. On the other hand, if the print, applied to the film, is substantially affected (e. g. in many cases substantially completely removed) by the application and subsequent stripping of the cellulose adhesive tape, the printing ink is characterised as not showing "ready acceptance" by that surface of the pre-formed solid film.

Cellulose adhesive tape, of the kind suitable for employment in this test, has a stripping load from a smooth, non-irradiated polyethylene film surface, when applied to the surface of the film with its adhesive surface in contact with the surface of the film, and pressed into contact with the surface of the film by rolling thereover a brass roller, 1" in diameter and ¾" in width, weighted to 600 grams, of between 70 grams and 150 grams for the ½" wide tape, when measured with a Suter tensile testing machine with the jaws separating at the steady rate of 13½" per minute.

The irradiation with ultra-violet light is carried out preferably in air at atmospheric pressure, but may alternatively be carried out at sub-atmospheric pressure or at super-atmospheric pressure, if desired. The air may be replaced, if desired, wholly or in part, by another gas, such as oxygen, nitrogen, or carbon dioxide.

The preferred range of wave lengths of ultra-violet light, with which the surface of the film of solid polyethylene plastic is subjected to irradiation, is comprised between the wave lengths 3200 A. and 1800 A. Low-pressure mercury vapour discharge tubes in quartz are the preferred source of ultra-violet light. Low-pressure mercury vapour discharge tubes in glass, and high-pressure mercury vapour discharge tubes in quartz or glass, are less effective, but may be employed if desired. Bright sunlight, at sea-level elevation and in the latitude of London, necessitates a very long exposure of three months or longer, and for this reason is not recommended as a source of ultra-violet light for the purposes of the present invention.

Irradiation with ultra-violet light of wave-length below 2000 A. is preferred. When the film is irradiated with ultra-violet light of wave-length below 2000 A., preferably the intensity of irradiation should not be less than 0.5 microwatt per square centimeter of the film surface, and the duration of the irradiation should be at least 180 microwatt-seconds per square centimeter of the film surface. As regards any particular conditions of source and distance, the duration of the irradiation treatment can be determined by a few trials. The following Examples A, B and C will serve by way of guidance.

EXAMPLE A

The surface of a film (0.005" thick) of polyethylene (average molecular weight 16,500) was subjected to irradiation with ultra-violet light sufficient to improve the bonding properties of the film to the extent that printing ink was readily accepted (as hereinbefore defined) by the irradiated surface of the solid film, by using a low-pressure mercury vapour discharge tube in quartz, 24" in length with an input of 15 watts.

The lamp emitted approximately 3 watts of radiation, of which 85% had a wavelength of 2537 A. and less than 0.1% had a wave-length less than 2000A.

The film of polyethylene showed ready acceptance of printing ink on its directly irradiated surface after exposure to this lamp at a distance of ½" for a period of longer than 2 minutes, and preferably for a period of 3 minutes.

EXAMPLE B

The surface of a film (0.005" thick) of polyethylene (average molecular weight 16,500) was subjected to irradiation with ultra-violet light in the way described in Example A, except that for the lamp employed in Example A there was substituted a lamp of similar type with an input of 15 watts, but 18" long and fitted with glass to cut off radiation of wave-length below 2000 A.

This lamp emitted approximately 4.5 watts of radiation, of which 65% was of wave-length 2537 A., and none was of wave-length below 2000 A.

The film of polyethylene showed ready acceptance of printing ink on its dircetly irradiated surface after exposure to this lamp at a distance of ½" for a continuous period of 20 minutes.

EXAMPLE C

The surface of a film (0.05" thick) of polyethylene (average molecular weight 16,500) was subjected to irradiation with ultra-violet light in the way described in Example A, except that for the lamp employed in Example A there was substituted a lamp of similar type, but 50" long and with an input of 65 watts.

The film of polyethylene showed ready acceptance of printing ink on its directly irradiated surface after exposure to this lamp at a distance of ½" for a period of longer than 1 minute, and preferably for a period of between 2 and 3 minutes.

Unduly prolonged exposure of the surface of the film of polyethylene plastic to the ultra-violet light appears to have no harmful effect upon the film, but should be avoided on the grounds of economy.

The temperature of the film in the irradiation zone is not critical. However, the temperature should not be in excess of that which, in the conditions prevailing, is incompatible with the stability of the polyethylene plastic of which the film is formed. Satisfactory results have been achieved when the film temperature has been within the range comprised between −40° C. and +300° C. Commercial solid polyethylene softens and melts at temperatures between 115° C. and 120° C., the temperatures of softening and melting of any particular sample of solid polyethylene depending upon its average molecular weight.

The molecular weight of the solid polyethylene employed is also not critical. Good results have been obtained by the irradiation of commercial solid polyethylene of average molecular weights ranging from 12,000 to 24,000 as measured by known solution viscosity methods.

The pre-formed film of solid polyethylene plastic is generally between 0.001" and 0.020", and preferably between 0.001" and 0.005", in thickness. The film may be in the form of e. g. sheet or tube.

The polyethylene plastic of which the film is formed may be, for example, commercial polyethylene, e. g. commercial polyethylene having an average molecular weight of 16,50, or a commercial plastic comprising polyethylene plasticised with a known plasticiser, such as polyisobutylene.

As the printing ink, any commercially available printing ink compounded for use on the surface of films of polyethylene plastic may be employed. As an example, mention may be made of "Omnilux" polyethene ink supplied by Colora Printing Inks Limited, Handsworth, London, E. C. 4. Generally speaking, commercially available printing inks that are normally employed for printing regenerated cellulose films of the plain type or of the moistureproof type respectively may also be employed with success for printing on the irradiated surface of the film of solid polyethylene plastic when in the cool condition, to yield printed film having good resistance to scuffing (i. e. rubbing two printed surfaces together vigorously between the fingers), and to stretching, and good ability to withstand the adhesive tape test as hereinbefore described. Such inks are available in the trade in large variety of qualities and colours.

In one procedure for carrying out the method of the invention, a film of solid polyethylene plastic is formed by extrusion in the hot, molten condition vertically upwards or downwards from an extrusion die in a known way. The extrusion die may be straight, in which case the film will be in the form of a sheet, or the die may be annular, in which case the film will be in the form of a tube. Both surfaces of the film are subjected to irradiation in air at atmospheric pressure, while the film is still hot, with ultra-violet light from a low-pressure vapour discharge tube in quartz, one surface being irradiated mainly by direct radiation from the discharge tube, the other mainly by radiation transmitted through the thickness of the film. The irradiation is sufficient to improve the bonding properties of the film to the extent that the printing ink is readily accepted by the irradiated surface of the film. Then, after the treated film has cooled to room temperature, it is printed, when in the cool condition, on at least one surface which has been irradiated, with a known printing ink compounded for use on solid polyethylene plastic. The printed film has good resistance to scuffing and to stretching, and it has good ability to withstand the adhesive tape test as hereinabove described.

In another procedure for carrying out the method of the invention, a solid film of polyethylene plastic in sheet form, in the course of being wound from a supply roll to a take-up roll, is subjected on both surfaces of the film to irradiation, in air at atmospheric pressure, from a low-pressure mercury vapour discharge tube in quartz. Although the operation of winding the film from the supply roll to the take-up roll takes place, broadly speaking, at room-temperature of about 20° C., the temperature of the film in the irradiation zone will normally exceed room-temperature by 5° C. to 50° C., depending on the heat generated by the tube and the efficiency of the ventilation that may be provided in the irradiation zone. The irradiation is sufficient to improve the bonding properties of the film to the extent that printing ink is readily accepted by the irradiated surface of the solid film. The film wound on the take-up roll, after having been stored in a cool place, is passed progressively through a printing machine of a known type, whereby it is printed, when in the cool condition, on at least one surface which has been irradiated, with a known printing ink compounded for use on films of solid polyethylene plastic. The printed film has good resistance to scuffing and to stretching, and it has good ability to withstand the adhesive tape test as hereinabove described.

The nature of any chemical or physico-chemical change that may be brought about by subjecting one or both surfaces of the film of solid polyethylene plastic to irradiation with ultra-violet light is not fully understood. The effect appears to be largely superficial, for the improvement in the bonding properties following irradiation is present only in a thin surface layer which may be removed by mechanical action, e. g. by scraping. Rather more favourable results are obtained by irradiation in an atmosphere of oxygen than in an atmosphere of air, but good results are obtainable by irradiation in a substantially oxygen-free atmosphere of nitrogen or carbon dioxide. Chemical examination shows that superficial oxidation, in cases where it occurs at all, is slight. The effect is hardly influenced by the incorporation in the solid polyethylene plastic film, in the usual proportion, of a known anti-oxidant therefor, such as the anti-oxidant supplied by the Enjay Co. Inc. of New York, U. S. A., under the registered trademark "Deenax."

Following is a description, by way of example only, of two methods of carrying the invention into effect.

Throughout the present specification, parts and proportions are by weight unless otherwise stated.

*Example I*

A film of solid polyethylene plastic was printed in the following way:

A tube of solid polyethylene, 6 inches in diameter and 0.005" thick, was formed by the extrusion of hot, molten polyethylene (average molecular weight 16,500) in a direction vertically upwards from an annular extrusion die into air in the known way. The linear speed of the upwardly moving extruded tube was 8 inches per minute. While the extruded film was cooling from the molten state, both surfaces thereof were irradiated with ultra-violet light emitted from discharge tubes, one surface being irradiated mainly by direct radiation from the discharge tubes, and the other mainly by radiation transmitted through the thickness of the film. The ultra-violet light was emitted by twelve annular low-pressure mercury vapour discharge tubes in quartz, having a combined power of 800 watts. The twelve annular discharge tubes were placed concentrically with the extruded tube at a distance of 1½" therefrom. The discharge tubes were spaced at intervals of 2" apart, so that irradiation continued over a distance of 24". Thus, during the passage of the extruded tube of polyethylene, each part of both surfaces thereof was subjected to irradiation with ultra-violet light, derived from the discharge tubes, for a period of 3 minutes.

It was found by trial, by printing on the outer irradiated surface of the solid film, when in the cool condition and subjecting the printed film to the adhesive tape test hereinabove described, that irradiation with ultra-violet light, in the way described above, had been sufficient to improve the bonding properties of the film to the extent that printing ink was readily accepted by the outer irradiated surface of the solid film.

The outer irradiated surface of the solid tube, when in the cool condition, was then printed, by passage through a printing machine of known type, with a printing ink of the following formulation:

| | Parts |
|---|---|
| Tritanium dioxide | 25 |
| Ethyl cellulose | 3 |
| Bedesol 76 [1] | 12 |
| Methyl phthalyl ethyl glycollate | 6 |
| Industrial spirits 740P | 37.8 |
| Ethyl lactate | 16.2 |
| | 100.0 |

[1] Bedesol 76 is a modified rosin esterified with pentaerythritol, and is soluble in spirit. It has a melting point of about 150° C. and an acid value of 100 to 110 mgs. KOH per one gram of resin. "Bedesol" is a registered trademark.

The printed film had good resistance to scuffing and to stretching, and the print was not stripped appreciably by the cellulose adhesive tape employed in the adhesive tape tests hereinabove described.

By way of control, it was found that as regards a film of solid polyethylene plastic, printed in the way described above, but with omission of the irradiation of both surfaces thereof with ultra-violet light emitted by the discharge tubes, the print was readily stripped from the base film by the cellulose adhesive tape in the adhesive tape test hereinabove described.

*Example II*

A film of solid polyethylene plastic was printed in the following way:

A continuous length of solid polyethylene sheet 20" wide and 0.0025" thick, was slowly drawn from a supply roll, passed in air over a horizontal plane surface 5' in length, and rewound on a take-up roll. The polyethylene of the sheet had a molecular weight of 16,500.

Both surfaces of the film were subjected to irradiation with ultra-violet light emitted by four low-pressure mercury vapour discharge tubes in quartz, each in the form of straight tubes 50" in length and each rated at 70 watts. One surface of the film was irradiated mainly by direct radiation transmitted through the thickness of the film. The discharge tubes were mounted parallel to the length of the polyethylene sheet centrally over the horizontal surface, parallel to each other and 6" apart, and ½" above the horizontal surface of the sheet. The four discharge tubes were fitted with reflectors of polished aluminium sheets to direct ultra-violet light in maximum intensity on to the surface of the sheet.

The continuous length of solid polyethylene sheet was passed, at the uniform speed of 1' per minute, in air over the horizontal plane surface, where it was subjected, on both surfaces, to irradiation with ultra-violet light emitted by the discharge tubes.

It was found by trial, in the way described by Example I, that irradiation with ultra-violet light, in the way described above, had been sufficient to improve the bonding properties of the film to the extent that printing ink was readily accepted by the outer irradiated surface of the solid film.

The outer irradiated surface (nearer the discharge tubes) of the solid polyethylene sheet, when in the cool condition, was then printed, by passage through a printing machine of a known type, with a printing ink of the formulation set out in Example I.

The printed film had good resistance to scuffing and to stretching, and the print was not stripped appreciably by the cellulose adhesive tape employed in the adhesive tape test hereinabove described.

Solid polyethylene plastic film as normally made, displays poor adhesion to the materials usually applied thereto as coatings to give self-sealing properties. Such adhesive materials commonly consist of natural or synthetic rubber together with a resin.

The poor adhesion between these materials and solid polyethylene plastic film is disadvantageous inter alia for the following reasons. After applying solid polyethylene adhesive tape to a surface, and subsequently stripping the tape, the adhesive is often incompletely removed with the tape, and some remains on the surface to which the tape was applied. Moreover, when a continuous reel of solid polyethylene adhesive tape is unwound, adhesive is often transferred from the coated side of the tape to the uncoated side of the next layer in contact with it.

We have now found that improvements in the properties of solid polyethylene adhesive tapes can be obtained by subjecting the film of solid polyethylene plastic to irradiation with ultra-violet light in the way described above, the film in this case being treated on one side only. This results in improved adhesion of the adhesive to the solid polyethylene film, and reduces or eliminates the transfer of adhesive from one layer to the next in a continuous reel.

Any known pressure-sensitive adhesive may be employed for surface coating the film backing. Thus, the pressure-sensitive adhesive may comprise, for example, rubber, or a rubber substitute such as polyisobutylene, together with a tack-promoting resin such as hydrogenated rosin or a soft alkyd resin. Other pressure-sensitive adhesives will be familiar to those skilled in the art.

In the preferred procedures, the pressure-sensitive adhesive is applied as a surface coating to the backing of treated film of solid polyethylene plastic from solution or dispersion in a volatile organic solvent or solvent mixture. After application of the solution or dispersion to the solid polyethylene plastic film, the solvent or solvent mixture is removed by evaporation by heat, preferably at temperatures within the range between 50° C. and 70° C.

Suitable volatile organic solvents include hydrocarbons such as toluene, or chlorinated hydrocarbons such as trichloroethylene. A proportion of polar solvent, for example an ester such as ethyl acetate, may be included, if desired.

The layer of pressure-sensitive adhesive of the pressure-sensitive adhesive tape of the invention maintains its adhesion to the backing film after the tape has been applied to a surface and subsequently stripped therefrom.

Bonding of film of untreated solid polyethylene plastic to many other materials, such as metal foils, by a heat-sealing operation involving the application of heat and pressure to the superposed polyethylene plastic film and other material, results in a joint between the film and the other material which is undesirably weak.

We have now found that the heat-seal bond strength of films of untreated solid polyethylene plastic to many other materials, by the application of heat and pressure thereto, as aforesaid, is enhanced by previously subjecting the film to irradiation with ultraviolet light, as described above. On release of the pressure and on cooling to room temperature, the contacting surfaces adhere together with bond-strength superior to that given by untreated film of solid polyethylene plastic.

The solid materials with which the films of solid polyethylene plastic may thus be laminated are:

Metals
Paper
Cardboard
Woven fabric
Non-woven fabric
Wood
Painted surfaces
Vinyl chloride polymers and copolymers
Polymethyl methacrylate
Polyethylene
Polystyrene
Cellulose acetate
Regenerated cellulose film (plain and moistureproof)

No improvement has been obtained with glass, porcelain, or polytetrafluoroethylene, while in the case of certain other solid materials, for example cellulose acetate, polystyrene, and the moistureproof types of regenerated cellulose film, the improvement shown is only relatively small.

The laminating operation may advantageously be performed in a continuous manner.

In one way of carrying out the laminating operation in a continuous manner, lengths of solid polyethylene plastic film and of the other solid material are superposed, and the superposed lengths are passed together over and in contact with a heated metal roller, pressure being applied by means of a second roller. The temperature to which the metal roller should be heated will depend upon a number of factors, including speed of passage, but in normal cases the temperature will lie within the range between 115° and 200° C., and preferably within the range between 115° C. and 130° C. Generally speaking, pressures lower than 4 ozs. per inch width are ineffective, a pressure of 1 lb. per inch width being preferred, though higher pressures of up to 100 lbs. per inch width may be employed, if desired.

In one way of carrying out the laminating operation in a discontinuous manner, the solid polyethylene plastic film, and other solid material are superposed and placed between two sealing jaws, heated to a temperature within the range between 115° and 200° C., and the jaws are then clamped together for a period of from ½ second to 10 seconds, whereby heat and pressure are applied to the assembly sufficient to cause the contacting surfaces thereof, on release of the pressure and on cooling, to adhere together with enhanced bond strength. Preferably the lamination is carried out with the sealing jaws at a temperature within the range between 115° C. and 130° C., a pressure between 15 and 20 lbs./sq. in. being applied for a period between 1 and 4 seconds. Adhesion between the polyethylene plastic film and the sealing jaws may be prevented by use of a parting sheet of plain regenerated cellulose film, or of polytetrafluoroethylene, or by coating the jaws with a thin coating of silicone grease or with a thin layer of polytetrafluoroethylene.

The following table illustrates the improvement obtained by using treated solid polyethylene plastic film (mol. wt.=18,000) instead of normal solid polyethylene plastic film (same mol. wt.) for heat-sealing to other solid materials. The treated polyethylene plastic film (0.002" thick) was obtained by subjecting the film, as formed, to irradiation for a period of 2 minutes, from a low-pressure mercury vapour discharge tube in quartz, 50" long and with an input of 65 watts, at a distance of ½" from the tube.

TABLE

| Material | Heat-seal Bond Strength obtained with untreated polyethylene plastic film (0.002") gms. | Heat-seal Bond Strength obtained with treated polyethylene plastic film (0.002") gms. |
|---|---|---|
| Aluminium foil (0.0004") | 17 | 110 |
| Zinc foil (0.0150") | 20 | 115 |
| Brass foil (0.0045") | 0 | 35 |
| Nickel foil (0.0065") | 0 | 130 |
| Tin foil (0.0035") | 0 | 40 |
| Kraft paper (0.007") | 100 | 250 |
| White paper (0.0035") | 80 | 150 |
| Thin cardboard (0.010") | 120 | 250 |
| Regenerated cellulose film (0.0015") coated with vinylidene chloride/methyl methacrylate/itaconic acid copolymer (95/4.5/0.5) moistureproof coating | 30 | 35 |
| Regenerated cellulose film (0.001") coated with nitrocellulose/wax moistureproof coating | 0 | 10 |
| Polyvinyl chloride film (0.003"), plasticised | 0 | 10 |
| Vinyl chloride/vinyl acetate copolymer film (0.002") | 5 | 55 |
| Polymethyl methacrylate (⅛" thick) | 0 | 60 |
| Polystyrene (0.002") | 5 | 15 |
| Cellulose acetate (0.003") | 0 | 5 |
| Bonded fibre fabric (0.004") | 300 | 340 |
| Wool (⅛" thick) | 130 | 190 |
| Paint (on wood) | 5 | 40 |
| Cotton fabric | 540 | 1,000 |

For purposes of comparison and definition, the following test has been used to measure the strength of the heat-seal bond:

A strip of the film of solid polyethylene plastic and a strip of the other solid material, each 1½" wide, are superposed, with a treated surface of the solid polyethylene plastic in contact with the other solid material, and a seal is made across the width of the material at one end, by placing the solid polyethylene plastic film on a metal plate heated to 140° C., and rolling over the superposed strips for 10 seconds a roller ¾" wide and weighted to 600 grams. Sticking of the polyethylene plastic film to the surface of the metal plate is prevented by using a parting sheet of "plain" regenerated cellulose film. The solid polyethylene plastic film and the strip of the other solid material so sealed are opened at the free ends and placed in a stretching device, such as a Suter testing machine, by gripping each end in suitable clamps, one of which is moved away at a constant speed of 12" per minute. The force in grams required to pull the film of solid polyethylene plastic and the strip of the other solid material apart is taken as a measure of the heat-seal bond strength.

The laminated products of the present invention have many applications in the arts. Thus, for example, laminates of solid polyethylene plastic film and paper are useful in making bags to hold chemical or wet products. Laminates of solid polyethylene plastic film and regenerated cellulose film are useful for making sachets containing shampoos, creams and the like, and for making gas-tight containers for vacuum packaging. Laminates of solid polyethylene plastic film and aluminum foil are useful for making containers for soaps and other hydroscopic powders, and for decorative purposes. Wooden boxes and metal containers to the inside of which solid polyethylene plastic film has been laminated may be used with advantage for the packaging of goods containing considerable proportions of water (such as cheese, fish, fresh vegetables, aqueous pastes and hygroscopic powders), or for containing corrosive chemical substances.

The accompanying drawing shows in diagrammatic form the arrangement of three types of apparatus for carrying out the irradiation process of the present invention.

Figure 1 shows a film of polyethylene plastic 10 which is moved past a battery of mercury vapour discharge tubes 11 provided with reflectors 12.

Figure 2:
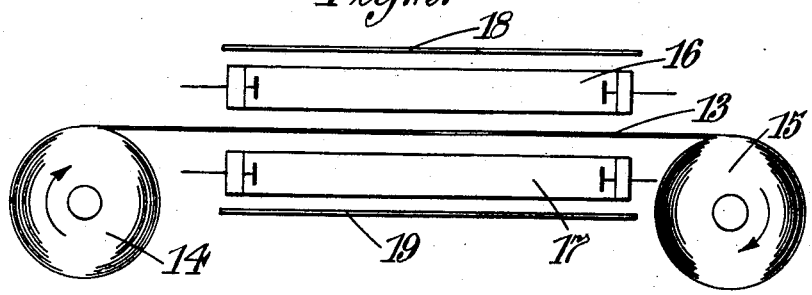

Figure 2 shows a film of polyethylene plastic 13 which passes from feed-reel 14 to take-up reel 15. Both surfaces of the film are irradiated with ultra-violet light from batteries of mercury vapour discharge tubes 16 and 17 provided with reflectors 18 and 19.

Figure 3:
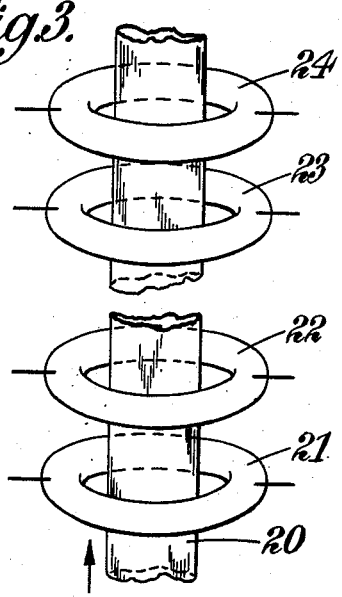

Figure 3 shows a tube of polyethylene plastic 20 which is moved continuously in an upward direction and is subjected to ultra-violet irradiation by passage through a series of annular mercury vapour discharge tubes 21, 22, 23, 24.

We claim:

1. A method of rendering the surface of a solid polyethylene film receptive to printing inks, which method comprises passing the film into an ultra violet light irradiation treatment zone in which at least one surface of the film is irradiated with ultra violet light of an intensity of at least 0.5 microwatt per square centimeter of said film surface, maintaining the film within the zone for such a period that the total irradiation is at least 180 microwatt seconds per square centimeter of said film surface and then removing the treated film from the irradiation zone.

2. A method of rendering the surface of a solid polyethylene film receptive to printing inks, which method comprises passing the film into ultra violet light of wavelength in the range of 3200 A. to 1800 A. and of an intensity of at least 0.5 microwatt per square centimeter of said film surface, maintaining the film within the zone for such a period that the total irradiation is at least 180 microwatt seconds per square centimeter of said film surface and then removing the treated film from the irradiation zone.

3. A method as claimed in claim 2 in which the film is irradiated with ultra violet light emitted from a low pressure mercury discharge tube in quartz.

4. A method of rendering the surface of a solid polyethylene film having an average modecular weight ranging from 12000 to 24000 and thickness between 0.001 inch and 0.020 inch, receptive to printing inks which method comprises passing the film into an ultra violet light irradiation treatment zone in which at least one surface of the film is irradiated with ultra violet light of wavelength 3200 A. to 1800 A. emitted from a low pressure mercury discharge tube in quartz and having an intensity of at least 0.5 microwatt per square centimeter of said film surface, maintaining the film within the zone for such a period that the total irradiation is at least 180 microwatt seconds per square centimeter of said film surface but such that the total period does not exceed 20 minutes and then removing the film from the irradiation zone.

References Cited in the file of this patent
UNITED STATES PATENTS

| | | |
|---|---|---|
| 1,878,318 | Pinder | Sept. 20, 1932 |
| 1,949,330 | Redd | Feb. 27, 1934 |
| 2,346,880 | Urbain | Apr. 18, 1944 |